United States Patent [19]

Bernardon et al.

[11] Patent Number: 5,322,665
[45] Date of Patent: Jun. 21, 1994

[54] DISPOSABLE SELF CONTAINED CARTRIDGE OR RESIN TRANSFER MOLDING AND RESIN TRANSFER MOLDING METHOD

[75] Inventors: Edward Bernardon, Bedford; Michael F. Foley, Cambridge, both of Mass.

[73] Assignee: The Charles Stark Draper Laboratories, Inc., Cambridge, Mass.

[21] Appl. No.: 912,840

[22] Filed: Jul. 13, 1992

Related U.S. Application Data

[63] Continuation-in-part of Ser. No. 869,384, Apr. 15, 1992.

[51] Int. Cl.$^5$ .............................................. B29C 67/14
[52] U.S. Cl. ............................... 264/571; 156/285; 156/382; 264/257; 264/316; 425/388; 425/405.1
[58] Field of Search .............. 264/257, 258, 313, 316, 264/510, 511, 571, 516; 425/389, 405.1, 388; 156/285, 382

[56] References Cited

U.S. PATENT DOCUMENTS

| | | | |
|---|---|---|---|
| 3,004,295 | 10/1961 | Bottoms et al. | 425/388 |
| 3,492,392 | 1/1970 | Kasamatsu et al. | 264/257 |
| 4,311,661 | 1/1982 | Palmer | 264/510 |
| 4,338,070 | 7/1982 | Nava | 423/417 |
| 4,379,013 | 4/1983 | Tambassi | 264/319 |
| 4,407,685 | 10/1983 | Hankland | 156/285 |
| 4,657,717 | 4/1987 | Cattanach et al. | 264/257 |
| 4,695,344 | 9/1987 | Crane et al. | 156/285 |
| 4,696,711 | 9/1987 | Greszczuk | 156/173 |
| 4,715,805 | 12/1987 | Nasu | 264/571 |
| 4,770,838 | 9/1988 | Cattanach et al. | 264/510 |
| 4,808,362 | 2/1989 | Freeman | 264/257 |
| 4,851,280 | 7/1989 | Gupta | 156/285 |
| 4,942,013 | 7/1990 | Palmer et al. | 264/511 |
| 4,946,640 | 8/1990 | Nathao | 264/316 |
| 4,975,311 | 12/1990 | Lindgren | 425/405.1 |
| 4,983,345 | 1/1991 | Kromrey | 264/313 |
| 5,013,514 | 5/1991 | Azzani et al. | 264/512 |
| 5,052,906 | 10/1991 | Seemann | 425/389 |
| 5,059,273 | 10/1991 | Boyce et al. | 156/307.4 |
| 5,059,377 | 10/1991 | Ashton et al. | 425/405.1 |
| 5,106,568 | 4/1992 | Honka | 264/510 |
| 5,108,532 | 4/1992 | Theih et al. | 156/285 |
| 5,128,090 | 7/1992 | Fujii et al. | 264/571 |
| 5,129,813 | 7/1992 | Shepherd | 264/511 |
| 5,134,002 | 7/1992 | Vallier | 425/389 |
| 5,151,277 | 9/1992 | Bernarden et al. | 425/112 |
| 5,156,795 | 10/1992 | Harvey et al. | 264/316 |
| 5,192,560 | 3/1993 | Unetsu et al. | 249/155 |

Primary Examiner—Jay H. Woo
Assistant Examiner—Robert B. Davis
Attorney, Agent, or Firm—Joseph S. Iandiorio; Kirk Teska

[57] ABSTRACT

A disposable self contained cartridge for resin transfer molding including a sealable flexible-walled vacuum bag surrounding fibrous reinforcing material to be impregnated and formed and a quantity of resin for impregnating the fibrous reinforcing material, and vacuum port to collapse the vacuum bag about the fibrous reinforcing material and the resin.

29 Claims, 3 Drawing Sheets

PERCENTAGE OF TOTAL COST
Breakdown per Cost Element

1000 Parts/Year
1 Year Program

5,322,665

DISPOSABLE SELF CONTAINED CARTRIDGE OR RESIN TRANSFER MOLDING AND RESIN TRANSFER MOLDING METHOD

RELATED CASES

This application is a continuation-in-part of: "Resin Transfer Molding System and Method", Ser. No. 07/869,384, having the same inventors and assignee, filed on Apr. 15, 1992.

FIELD OF INVENTION

This invention relates to a disposable self contained cartridge for resin transfer molding in which fibrous reinforcing material is formed and cured and may be impregnated as well while enclosed in a disposable self-contained cartridge.

BACKGROUND OF INVENTION

Fiber reinforced composite parts are fabricated utilizing a variety of conventional techniques including resin transfer molding ("RTM"), PREPREG procedures, and preforming operations.

One improvement in RTM is discussed in the applicants, invention entitled "Resin Transfer Molding System and Method" of which this application is a continuation-in-part.

It has been determined that one disadvantage of RTM is that there is a steep learning curve associated with switching to new geometries. Placement of the sprues and vents for resin injection and transfer is not elementary. Therefore, when different geometry parts are to be impregnated by RTM, costly experimentation and analysis is necessary to optimize processing variables and tool design to achieve void free uniform wet out. The analysis required in part stems from the limitation that in conventional RTM operations, resin must travel across the fiber bed.

Another disadvantage is the cost of cleaning the tools associated with RTM. Resin has a tendency to cake on the tools and will ruin the surface finish of the next part to be impregnated if it is not adequately cleaned off the tool surfaces. The biggest disadvantage, however, is the labor intensive and hence costly lay-up of the sheets of dried fiber on a mold surface.

Conventional PREPREG techniques somewhat overcome the void free uniform wetout problems inherent in RTM, but conventional PREPREG techniques require expensive raw materials, costly hand lay-up, and the added equipment cost associated with the autoclave required for curing. And, the autoclave itself adds process variables which must be evaluated as part geometries change.

Certain preforming techniques include utilizing elastomeric sheets which purportedly eliminate the hand lay-up associated with RTM, but as with PREPREG procedures, the raw materials are expensive, and since the preform part must eventually be impregnated, tool cleaning costs as well as the costs associated with void free impregnation are as high as RTM.

Therefore, these methods do not solve the problems of costly hand lay-up, the difficult and complicated analysis required to achieve quality uniform impregnation, and the required cleaning of tools.

SUMMARY OF INVENTION

It is therefore an object of this invention to provide a disposable self-contained cartridge for resin transfer molding and a resin transfer molding method using the disposable self contained cartridge.

It is a further object of this invention to provide such a disposable self-contained cartridge and method which eliminates costly hand lay-up of the fibrous reinforcing material.

It is a further object of this invention to provide such a disposable self-contained cartridge and method which eliminates the difficult and complicated analysis required to achieve uniform impregnation required for quality parts.

It is a further object of this invention to provide such a disposable self-contained cartridge and method which eliminates the costly clean up of resin caked tools associated with RTM.

It is a further object of this invention to provide such a disposable self-contained cartridge and method in which impregnation, forming and curing of the fibrous reinforcing material occurs in a sealable flexible walled vacuum bag.

It is a further object of this invention to provide such a disposable self-contained cartridge and method which is also advantageous when using a workpiece with the fiber and resin already combined as a PREPREG.

It is a further object of this invention to provide such a disposable self-contained cartridge and method which is employable with a wide variety of forming tools and presses.

It is a further object of this invention to provide such a disposable self contained cartridge and method which allows impregnation of the fibrous reinforcing material to occur through the thickness of the fibrous reinforcing material wherein resin travels through the fiber bed as opposed to across it.

It is a further object of this invention to provide such a disposable self contained cartridge and method which achieves higher final part quality and lower cycle time for impregnation.

It is a further object of this invention to provide such a disposable self contained cartridge and method which reduces the development time for new parts.

This invention results from the realization that costs and problems associated with hand lay-up of fibrous reinforcing material, the analysis and experimentation required to achieve uniform impregnation, and the cleaning of tools associated with conventional forming techniques can be solved by a disposable self-contained cartridge in which fibrous material to be impregnated and formed and a quantity of resin is enclosed in a sealable flexible walled vacuum bag for the duration of shipping, storage, impregnation, forming and curing of the fibers reinforcing material. Alternatively, a workpiece with the fiber and resin already combined such as a PREPREG could be used.

This invention may be accomplished by a disposable self contained cartridge for resin transfer molding wherein a sealable flexible walled vacuum bag is collapsed about a workpiece including fibrous reinforcing material as well as a quantity of resin for impregnating the fibrous reinforcing material. There are means to collapse the vacuum bag about the workpiece such as a vacuum port for drawing a vacuum within the bag to collapse its flexible walls about the workpiece either loosely or sufficient to cause the contours of the bag to conform to the contours of the workpiece.

Alternatively, the workpiece may include fibrous reinforcing material and resin precombined as a PREPREG material.

The workpiece may include release film to facilitate removal of the cured fibrous reinforcing material from the vacuum bag after impregnation and forming. Vacuum tape may be used to seal the release film about the workpiece. Also, a coating of release material may be disposed on the interior of the vacuum bag for this purpose. To facilitate the removal of air from within the bag, there may be breather material disposed inside the vacuum bag and/or a textured layer having air flow passages within the vacuum bag.

This invention also features resin solid at room temperature disposed proximate the fibrous reinforcing material which, when heated, will flow through the thickness of the fibrous reinforcing material improving the uniformity of impregnation since the resin does not need to flow across the fiber bed.

Also featured is a resin transfer molding method in which fibrous reinforcing material is assembled with a quantity of resin sufficient for impregnating the fibrous reinforcing material. The assembly is then enclosed in a sealable flexible walled vacuum bag which is provisionally sealed about the assembly. Also included are the steps of wetting the fibrous reinforcing material with the resin, subjecting the cartridge to forming means to form a desired part shape and then removing the vacuum bag from the formed part.

DISCLOSURE OF PREFERRED EMBODIMENT

Other objects, features and advantages will occur to those skilled in the art from the following description of a preferred embodiment and the accompanying drawings, in which.

Figure 4A:
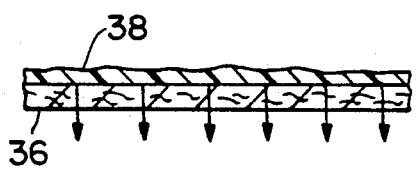
Figure 4B:
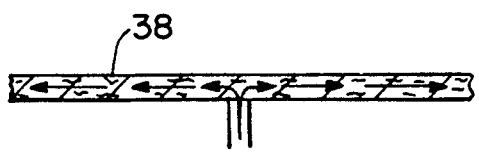
Figure 5:
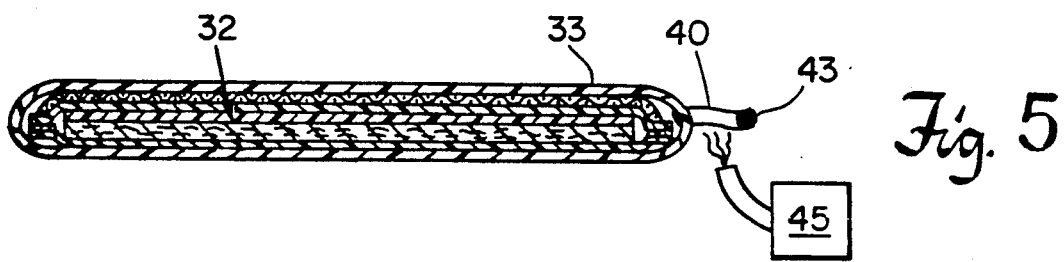
Figure 6:
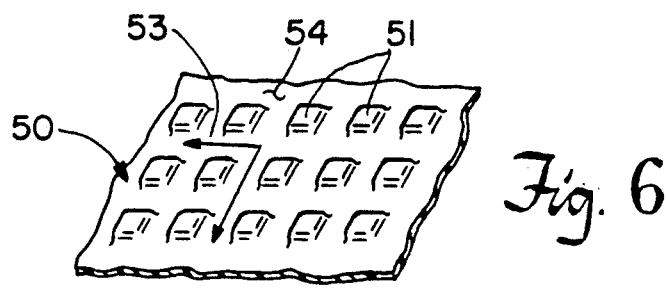
Figure 7A:
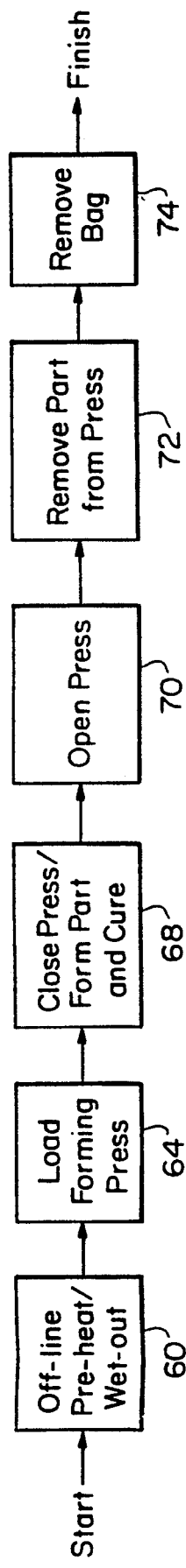
Figure 7B:
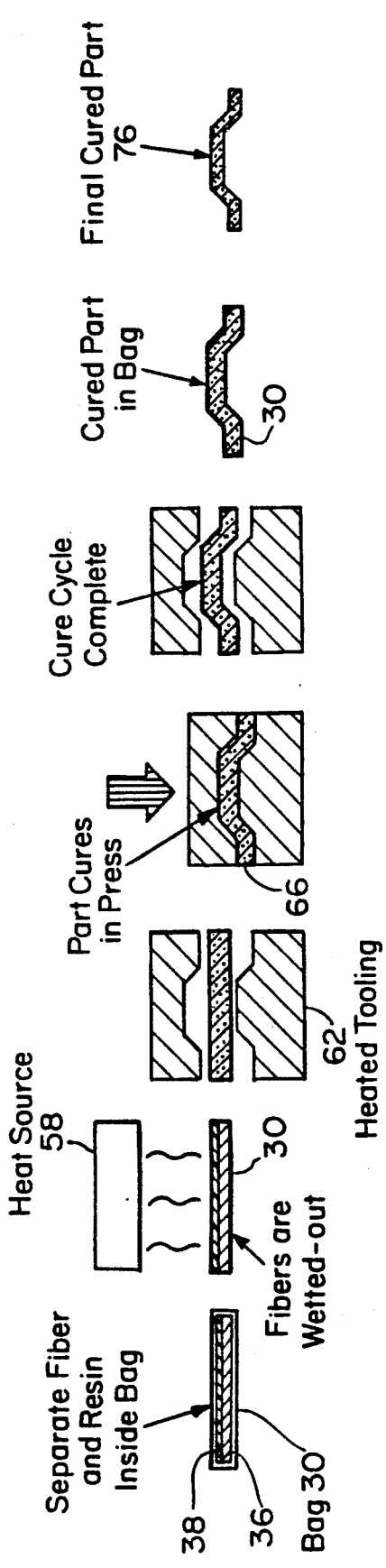

FIGS. 4A and 4B schematically show through the thickness impregnation according to this invention and transverse impregnation;

FIG. 5 is a schematic cross sectional view of the self-contained cartridge of this invention collapsed about the workpiece;

FIG. 6 is an enlarged detailed view of one construction of the cartridge wall which allows for breathing; and FIGS. 7A and 7B show a process flow in accordance with this invention.

Figure 1:
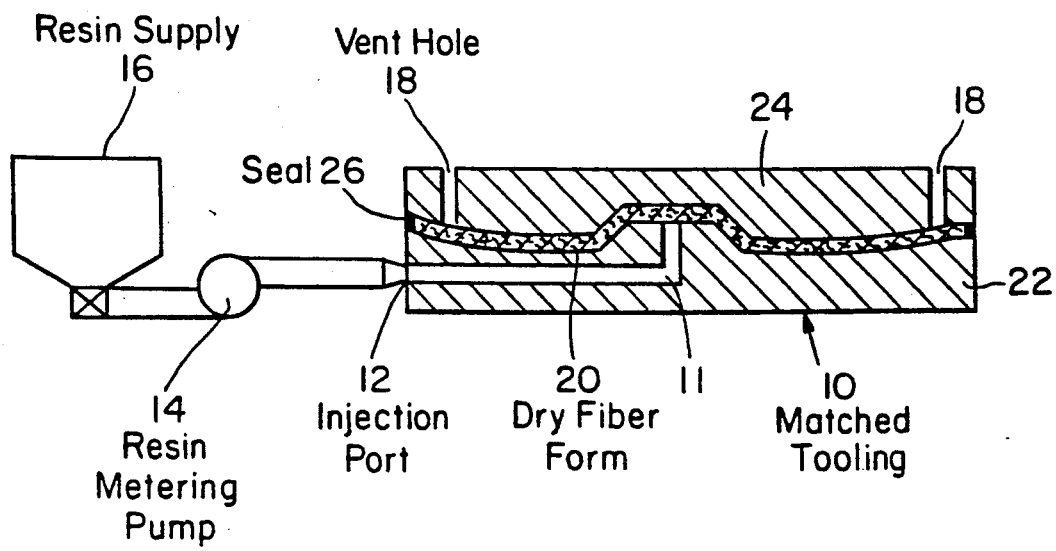
FIG. 1 is a schematic cross section of a prior art apparatus used for resin transfer molding.

A conventional resin transfer molding apparatus, FIG. 1, includes matched tooling 10, injection port 12, resin pump 14, resin supply 16, and vent hole 18. Fiber material 20 is laid up by hand on lower portion 22 of tooling 10. Upper portion 24 is then closed and sealed with lower portion 22 via seal 26; and resin 16 is injected through port 12 via pump 14.

As discussed previously in the Background of Invention, the positioning of injection port 12 and vent hole 18, or of multiple sprues and vents (not shown), is not elementary. When part geometries change, analysis and experimentation must be performed in order to assure quality void free impregnation of fiber material 20. Also, after a part is impregnated and formed, resin must be cleaned off upper portion 24 and lower portion 22 of tooling 10 before the next part can be formed.

Figure 2:
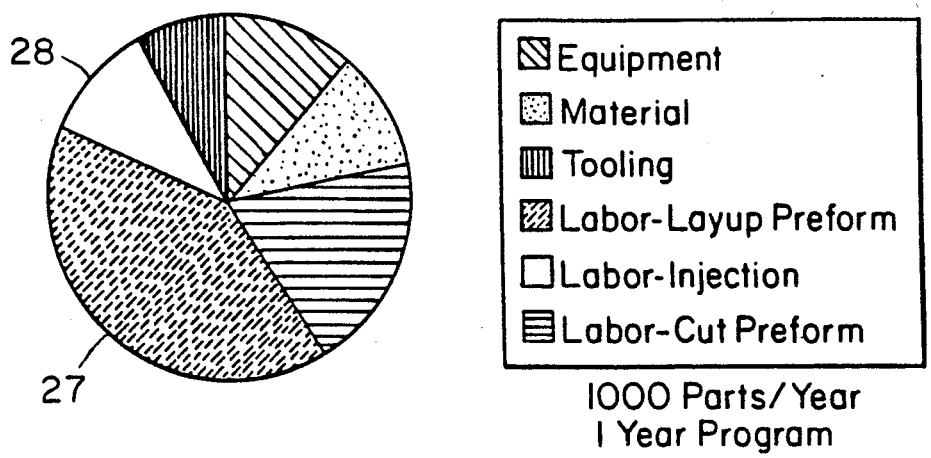
FIG. 2 is a breakdown per cost element of the conventional RTM process.

The labor intensive and costly hand lay-up of fiber material 20 on lower portion 22, however, is one of the greatest disadvantages of conventional RTM systems. Lay-up of the preform 27, FIG. 2, and injection labor 28 are substantial cost centers of RTM.

Figure 3A:
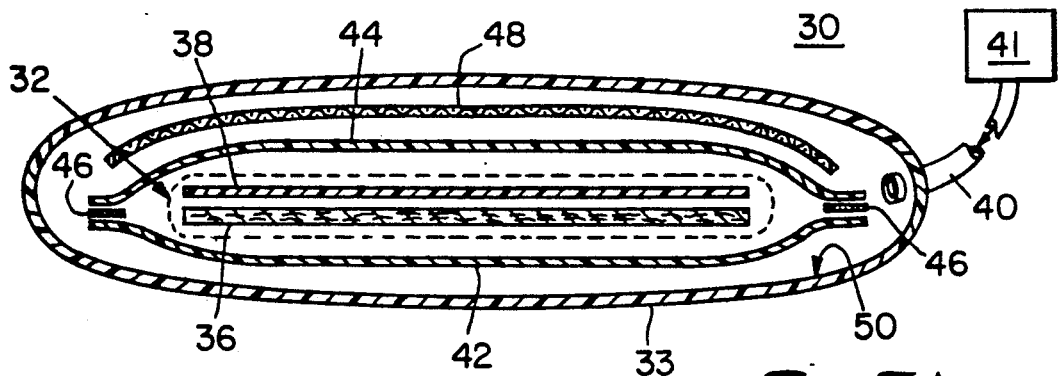
FIG. 3A is a schematic cross sectional view of the disposable self-contained cartridge having a workpiece with separate fibrous reinforcing material and resin according to this invention.

The disposable self-contained cartridge 30, FIG. 3A, according to this invention is shown with workpiece 32 enclosed in flexible walled vacuum bag 33. Workpiece 32 includes fibrous reinforcing material 36 and resin 38. In this embodiment resin 38 is in the form of a sheet of resin solid at room temperature, but this is not a limitation of the present invention, e.g., resin 38 may be liquid at room temperature, or could be in the form of granules spread about fibrous reinforcing material 36. Resin 38, solid at room temperature, is another feature of this invention since when heated to above its flow point it will flow through the thickness of the fiber bed 36, FIG. 4A. Accordingly, the problems inherent in the proper placement of the sprue 11, FIG. 1, and vents 18 are eliminated. In a conventional RTM system, resin must flow across the fiber bed 36 as shown in FIG. 4B. Since cartridge 30, FIG. 3A, is self contained, no sprues or vents are required and the resin 38 will flow through the thickness of fibrous material 36.

Vacuum port 40 may be connected to vacuum source 41, FIG. 3A, to draw a vacuum inside a vacuum bag 33 collapsing vacuum bag 33 about workpiece 32 for the duration of storage, transport, and forming of fibrous reinforcing material 36. Once a vacuum is drawn within vacuum bag 33, flexible-walled vacuum bag 33 will be collapsed about workpiece 32 as shown in FIG. 5 and vacuum port 40 may be provisionally or permanently sealed as shown. Port 40 may be used to draw a vacuum in bag 33 to cause the contours of bag 33 to mirror those of workpiece 32, or vacuum port 40 may be used to withdraw only some of the air to loosely collapse vacuum bag 33 about workpiece 32. Vacuum port 40 may be provisionally sealed by a plug 43, or similar means, or more permanently sealed by heat sealing means 45, or ultrasonic or other means.

During forming operations, cartridge 30 is heated either on-line or off-line to cause resin 38 to wet fibrous reinforcing material 36. As explained, through-the-thickness impregnation is another advantage over conventional RTM processes where resin must flow across the fiber bed as shown in FIGS. 1 and 4B. Through the thickness impregnation FIG. 4A, provides more uniform impregnation since the resin does not need to flow as far. Further, the resin injection pump is eliminated, and cycle times are decreased. In a preferred embodiment, then, resin 38, FIG. 3A, is in the form of a sheet solid at room temperature such as Dow Taxtix 742 or 3M PR 500. Since resin 38 is solid at room temperature, cartridge 30 can be stored or shipped without partial curing of resin 38 or contamination of fibrous reinforcing material 36. Workpiece 32 including fibrous reinforcing material 36 and resin 38 enclosed in flexible wall vacuum bag 33 eliminates the need for the complicated analysis and experimentation for proper placement of the sprues and vents required in conventional RTM systems. The sprues and vents are eliminated because the cartridge of the present invention is self contained.

That is, it contains both the fibrous reinforcing material 36 and resin 38 for resin injection of fibrous reinforcing material 36. Also, since the fibrous reinforcing material 36 and resin 38 is at all times enclosed within sealable flexible walled vacuum bag 33, resin 38 has no chance to contaminate tools used in forming fibrous reinforcing material 36. Most importantly, cartridge 30 eliminates the costly hand lay-up of the fibrous reinforcing material since one or more plies of the material 36 is placed with resin 3 in the sealable flexible walled vacuum bag 33 during shaping, forming, and curing.

Figure 3B:
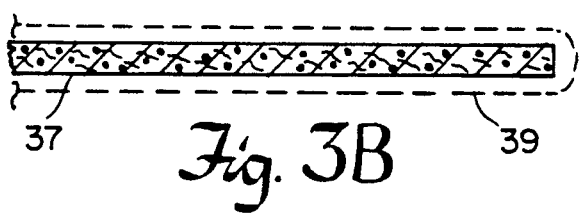
FIG. 3B is a schematic cross sectional view of the disposable self-contained cartridge having a workpiece with fibrous reinforcing material and resin precombined as a PREPREG according to this invention.

In an alternative configuration, workpiece 39, FIG. 3B could include fibrous reinforcing material precombined with resin as PREPREG 37. Although the PREPREG is more costly than raw fiber and resin, it may be desirable in some applications. Cartridge 30, FIG. 3A, however is inherently useful in forming PREPREG materials for the same reason it may be used for raw fiber and resin. Tools are not contaminated, everything is self contained, and cartridge 30 can be used for the duration of storage, shipping, and molding.

Cartridge 30, FIG. 3A, may also include sheets of release film 42 and 44 disposed about workpiece 32 to prevent resin 38 from sticking to sealable flexible walled vacuum bag 33. Vacuum tape 46 may be used to seal release film sheets 42 and 44 about workpiece 32. Also, a breather surface or material 48, FIG. 3A, may be incorporated within cartridge 30 to facilitate the removal of air from within vacuum bag 33. Finally, interior surface 50 FIG. 6, of flexible walled vacuum bag 33 FIG. 3A, may be textured as is shown in FIG. 6 with lands 51 forming passages 53, to facilitate the evacuation of air within flexible wall vacuum bag 33 when a vacuum is drawn via vacuum port 40, FIG. 3A. Finally, interior surface 50, FIG. 6 of flexible walled vacuum bag 33 may be coated with release material 54 to facilitate removal of the cured part when the forming operation is complete.

It is also within the scope of the present invention to use the disposable self-contained cartridge 30 in the method shown in FIGS. 7A and 7B. Cartridge 30, FIG. 7B, is heated, FIG. 7A, step 60, by heat source 58 to cause resin 38 to wet fibrous reinforcing material 36. Next, cartridge 30 is placed in forming press 62, step 64, which may be heated to the resin cure temperature. The press is closed, step 68, to form and cure impregnated fibrous reinforcing material 66 following the recommended cure cycle for the resin. At the end of the cure cycle, step 70, the press is opened, and vacuum bag 30 is removed from the press, step 72. In final step 74, the disposable cartridge 30 is removed from the final cured part 76.

In this way, resin transfer molding is accomplished without costly labor intensive hand lay-up, without complicated analysis and experimentation concerning placement of the sprues and vent holes, and without any need to clean resin contaminated tools. Finally, cartridge 30, FIGS. 3A and 2B can be used in a variety of tooling arrangements or forming means and easily configured from many different parts by manipulating the number of plies of fibrous reinforcing material and the quantity of resin.

It is contemplated by the present invention that other steps may be incorporated other than as shown in FIGS. 4A and 4B, as required for various part configurations and also that the ordering of processing shown and described may be varied. Also, forming could be accomplished by means other than male and female mold halves. Vacuum forming methods could be used and vacuum port 40, FIG. 3A, may be utilized in conjunction with these methods.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A disposable self-contained cartridge for resin transfer molding comprising:
    a workpiece including fibrous reinforcing material and a quantity of resin for impregnating said fibrous reinforcing material;
    a unitary sealable flexible walled vacuum bag peripherally surrounding and enclosing said workpiece; and
    means for collapsing the walls of said vacuum bag about said workpiece enclosing said workpiece therein on each side thereof.

2. The disposable self-contained cartridge of claim 1 in which said cartridge further includes release film disposed inside said sealable flexible walled vacuum bag and about said workpiece for facilitating removal of cured fibrous reinforcing material from the flexible walled vacuum bag after forming.

3. The disposable self-contained cartridge of claim 2 in which said cartridge further includes vacuum tape for sealing said release film about said workpiece.

4. The disposable self-contained cartridge of claim 1 in which said means for collapsing said sealably flexible walled vacuum bag about said workpiece includes a vacuum port in said bag for drawing a vacuum within said bag to collapse the flexible walls of said bag about said workpiece.

5. The disposable self-contained cartridge of claim 1 further including means to facilitate the removal of air from within said sealable flexible walled vacuum bag.

6. The disposable self-contained cartridge of claim 5 in which said means to facilitate the removal of air includes breather material disposed inside said sealable flexible walled vacuum bag.

7. The disposable self-contained cartridge of claim 5 in which said means to facilitate the removal of air includes a textured layer having air flow passages disposed inside said flexible walled vacuum bag.

8. The disposable self-contained cartridge of claim 1 further including a coating of release material on the interior of said flexible walled vacuum bag for facilitating removal of cured material from said vacuum bag.

9. The disposable self-contained cartridge of claim 1 in which said quantity of resin is a sheet of resin solid at room temperature.

10. A disposable self contained cartridge for resin transfer molding comprising:
    fibrous reinforcing material;
    a sheet of resin solid at room temperature proximate said fibrous reinforcing material;
    a unitary sealable flexible walled vacuum bag collapsed about and peripherally surrounding said fibrous reinforcing material and said resin enclosing said material and said resin therein.

11. A disposable self contained cartridge for resin transfer molding comprising:
    a workpiece including fibrous reinforcing material to be impregnated and formed, a sheet of resin solid at room temperature proximate said fibrous reinforcing material, release film sealed about and surrounding said fibrous reinforcing material and said resin, and breather material disposed proximate said release film; and a unitary sealable flexible walled vacuum bag collapsed about and peripherally surrounding said workpiece enclosing said workpiece therein.

12. A disposable self contained cartridge for resin transfer molding comprising:
a workpiece including fibrous reinforcing material to be impregnated and formed, a sheet of resin solid at room temperature proximate said fibrous reinforcing material, release film sealed about and surrounding said fibrous reinforcing material and said resin, and breather material disposed proximate said release film; and
a unitary sealable flexible walled vacuum bag collapsed about and peripherally surrounding said workpiece wherein the contours of the vacuum bag conform to the contours of said workpiece enclosing said workpiece therein.

13. A disposable self contained cartridge for resin transfer molding comprising:
a workpiece including fibrous reinforcing material to be impregnated and formed, a sheet of resin solid at room temperature proximate said fibrous reinforcing material, release film sealed about and surrounding said fibrous reinforcing material and said resin, breather material disposed proximate said release film; and
a unitary sealable flexible walled vacuum bag collapsed about and peripherally surrounding and enclosing said workpiece, said vacuum bag including an interior textured surface having air flow passages for facilitating the removal of air from within said vacuum bag about said workpiece.

14. A resin transfer molding method comprising:
assembling fibrous reinforcing material and a quantity of resin sufficient for impregnating said fibrous reinforcing material;
peripherally enclosing said assembly inside a unitary sealable flexible walled vacuum bag; and
provisionally sealing said vacuum bag about said assembly.

15. A resin transfer molding method comprising:
assembling fibrous reinforcing material and a quantity of resin sufficient to impregnate said fibrous reinforcing material;
peripherally enclosing said assembly inside a unitary sealable flexible walled vacuum bag;
collapsing said sealable flexible walled vacuum bag about said assembly to form a disposable cartridge for resin transfer molding.

16. The method of claim 15 further including wetting said fibrous reinforcing material with said resin.

17. The method of claim 16 further including subjecting said disposable cartridge to forming means to form said fibrous reinforcing material to a desired part shape.

18. The method of claim 17 further including removing said sealable flexible-walled vacuum bag from said formed part.

19. A disposable self-contained cartridge for PREPREG material molding comprising:
a workpiece including fibrous reinforcing material and resin precombined as PREPREG material;
a unitary sealable flexible walled vacuum bag peripherally surrounding and enclosing said workpiece; and
means for collapsing said vacuum bag about said 20. The disposable self-contained cartridge of claim 19 in which said cartridge further includes release film disposed inside said sealable flexible walled vacuum bag and about said workpiece for facilitating removal of cured fibrous reinforcing material from the flexible walled vacuum bag after forming.

21. The disposable self-contained cartridge of claim 20 in which said cartridge further includes vacuum tape for sealing said release film about said workpiece.

22. The disposable self-contained cartridge of claim 19 in which said means for collapsing said sealably flexible walled vacuum bag about said workpiece includes a vacuum port in said bag for drawing a vacuum within said bag to collapse the flexible walls of said bag about said workpiece.

23. The disposable self-contained cartridge of claim 19 further including means to facilitate the removal of air from within said sealable flexible walled vacuum bag.

24. The disposable self-contained cartridge of claim 23 in which said means to facilitate the removal of air includes breather material disposed inside said sealable flexible walled vacuum bag.

25. The disposable self-contained cartridge of claim 24 in which said means to facilitate the removal of air includes a textured layer having air flow passages disposed inside said flexible walled vacuum bag.

26. The disposable self-contained cartridge of claim 19 further including a coating of release material on the interior of said flexible walled vacuum bag for facilitating removal of cured material from said vacuum bag.

27. A disposable self contained cartridge for PREPREG material molding comprising:
a workpiece including fibrous reinforcing material and resin combined as a PREPEG material, release film sealed about and surrounding said PREPREG material, and breather material disposed proximate said release film; and
a unitary sealable flexible walled vacuum bag collapsed about and peripherally surrounding and enclosing said workpiece.

28. A disposable self contained cartridge for PREPREG material molding comprising:
a workpiece including fibrous reinforcing material and resin combined as a PREPREG material, release film sealed about and surrounding said PREPREG material, and breather material disposed proximate said release film; and
a unitary sealable flexible walled vacuum bag collapsed about and peripherally surrounding and enclosing said workpiece wherein the contours of the vacuum bag conform to the contours of said workpiece.

29. A disposable self contained cartridge for PREPREG material molding comprising:
a workpiece including fibrous reinforcing material and resin combined as PREPREG material, release film sealed about and surrounding said PREPREG material, breather material disposed proximate said release film; and
a unitary sealable flexible walled vacuum bag collapsed about and peripherally surrounding and enclosing said workpiece, said vacuum bag including an interior textured surface having air flow passages for facilitating the removal air from within said vacuum bag to collapse said vacuum bag about said workpiece.

* * * * *